Feb. 20, 1951   A. V. LOCATELLI   2,542,874
APPARATUS FOR FORMING STRUCTURAL COMPRESSED ELEMENTS
OBTAINED BY MEANS OF THE EXPANSION OF ELASTIC TUBES,
BAGS, AND DIAPHRAGMS INSIDE RIGID FLASKS
Filed Feb. 28, 1948   4 Sheets-Sheet 4

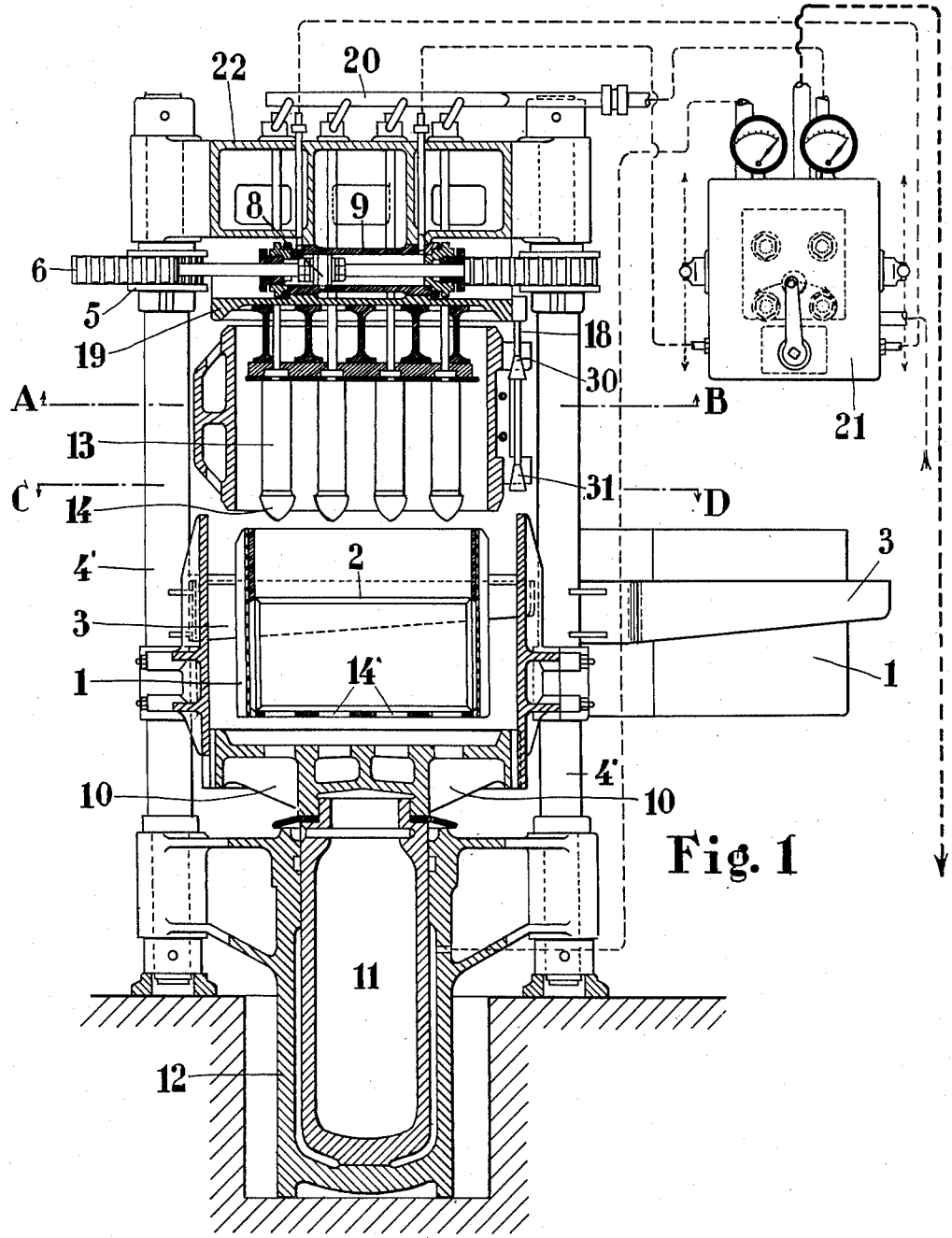

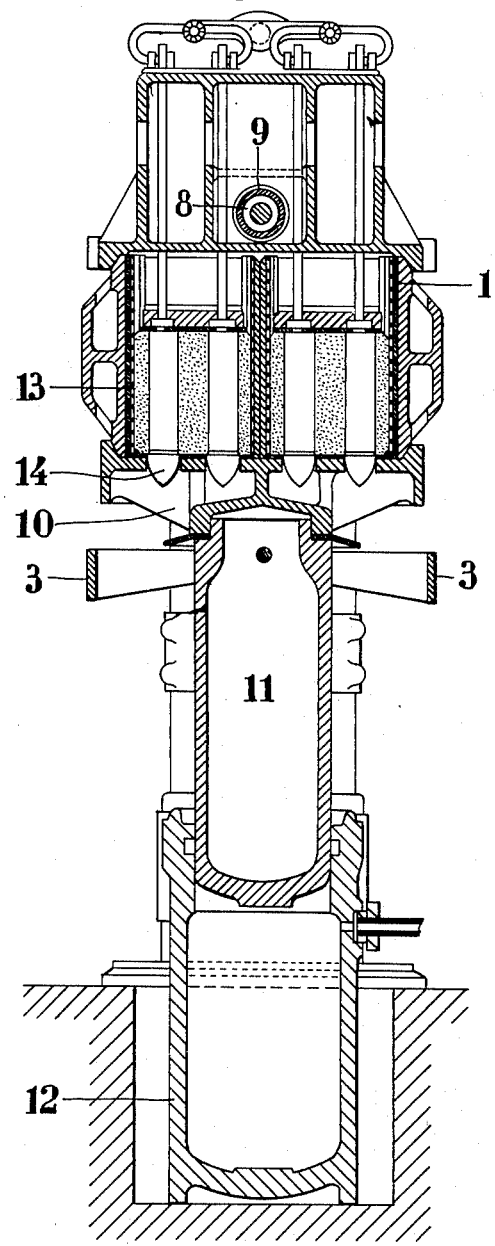
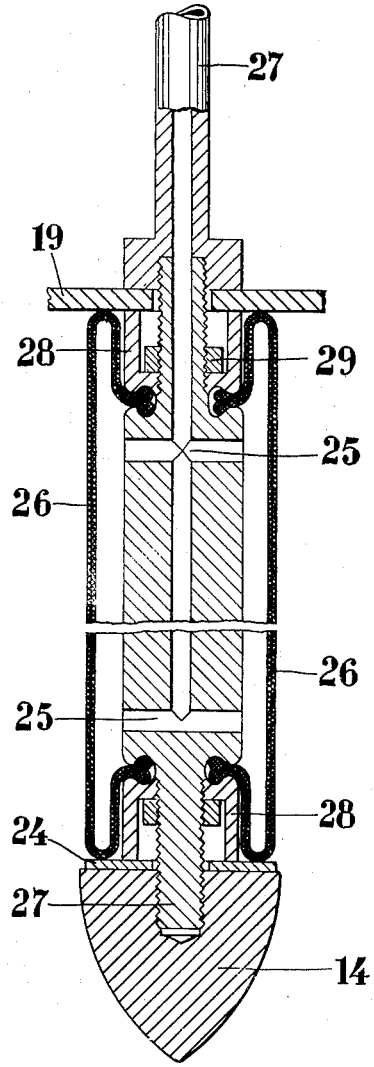

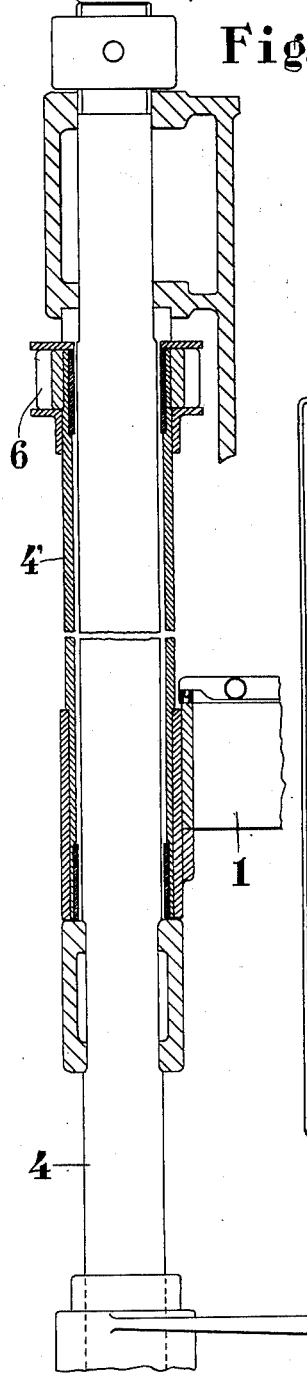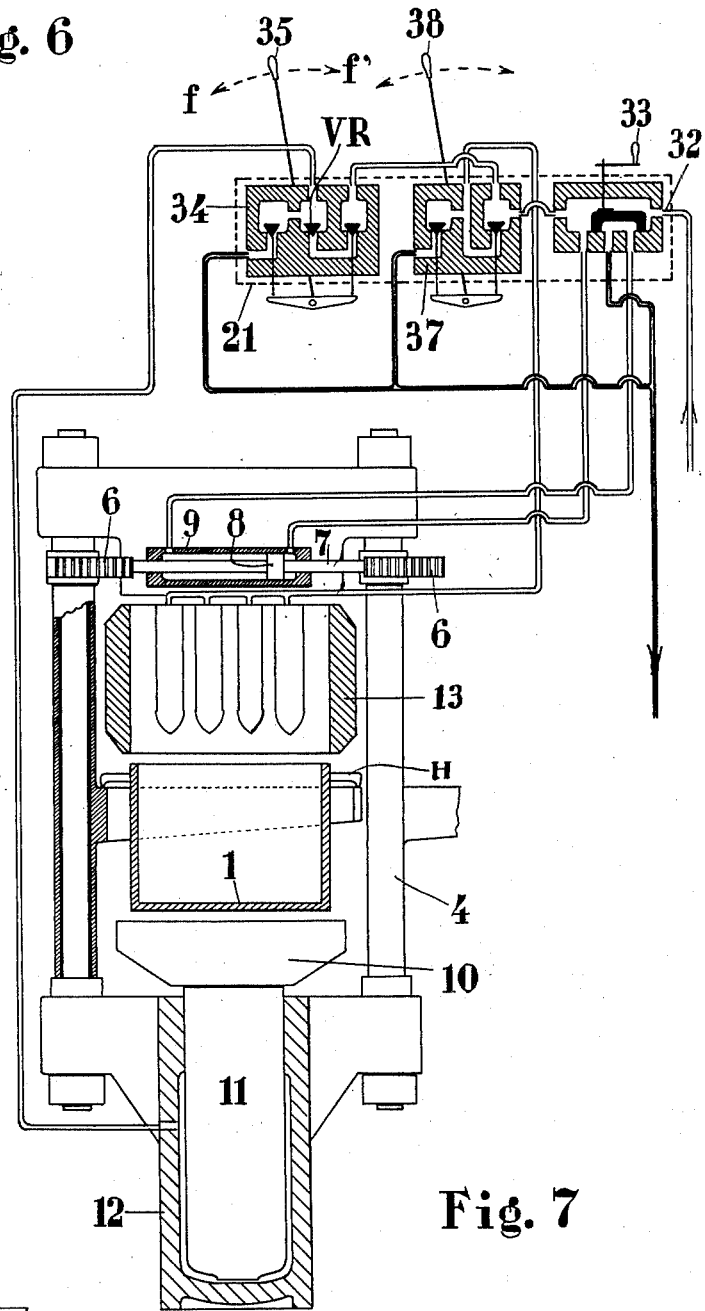

INVENTOR
Antonio V. Locatelli
by Bertram Ottinger
ATTORNEY

Patented Feb. 20, 1951

2,542,874

UNITED STATES PATENT OFFICE 2,542,874

APPARATUS FOR FORMING STRUCTURAL COMPRESSED ELEMENTS OBTAINED BY MEANS OF THE EXPANSION OF ELASTIC TUBES, BAGS, AND DIAPHRAGMS INSIDE RIGID FLASKS

Antonio Vittorio Locatelli, Rome, Italy

Application February 28, 1948, Serial No. 12,068
In Rumania February 23, 1944

14 Claims. (Cl. 25—45)

The general object of the invention is that of obtaining structural elements from compressed powdery materials which can conglomerate under the action of strong pressures.

The powdery materials adapted to be treated with this process, are placed inside rigid flasks wherein are also disposed elastic elements with a tight fit, adapted to be expanded under the action of a fluid under pressure supplied to them, so that said materials are agglomerated and rendered compact by being pressed between said expanded elastic elements and the rigid walls of the flask.

The powdery materials to be used may be clay, ordinary earth or like materials, which are powdery by nature or may be crushed to fine powder, to which liquids or other powders may be added in order to increase their power to agglomerate under the action of the pressure, and in order to increase their resistance to atmospheric agents.

The rigid flasks are formed with metal plates having a sufficient thickness so as not to deform under the action of the pressure exerted on them by the powdery materials, when these latter are being compressed by the expansion of the elastic elements, owing to the fluid under pressure delivered to them.

The tight elastic elements consist of prisms, tubes, bags or diaphragms, having a sufficient thickness to enable them to withstand, without breaking, the expansion produced by the pressure of the fluid admitted to them. Instead of rubber, leather, pergmoid, linen, or any other suitable material may be used, provided however that all such materials are able to withstand the expansion produced by the pressure used. The elastic elements may be strengthened, if required, with layers of leather or with other suitable materials, or with metal stiffeners or even provided with shaped rigid pieces, in order to obtain special external or internal shapes of the compressed articles.

Hereinafter will be described some particular forms for compressed elements and some devices designed to attain that end, according to the present invention.

It should however be understood that the examples shown are not intended to limit the scope of the invention, which includes any massive article, having one or more internal cavities, obtained by compression exerted by elastic tubes, prisms, bags or diaphragms against materials contained inside indeformable flasks of any size, for example, a rubber cube having the size of a chamber, adapted to compress the material introduced between said elastic cube and a dismountable rigid flask, corresponding to the outer shape of said chamber.

A device adapted for such purpose is shown in the drawings wherein,

Fig. 1 is a vertical section through a press embodying my invention with a flask on the platform before the latter is raised and another flask at the side;

Fig. 2 is a vertical section through the press in a plane perpendicular to that shown in Fig. 1, the filled flask being shown lifted and in molding position;

Fig. 3 is an enlarged vertical section through one of the punches;

Fig. 6 is an enlarged vertical section through one of the rotating columns of the press with its related gears for swinging the flasks; and Fig. 7 is a schematic detail of the distribution panel, the press being shown in simplified form.

Figure 4:
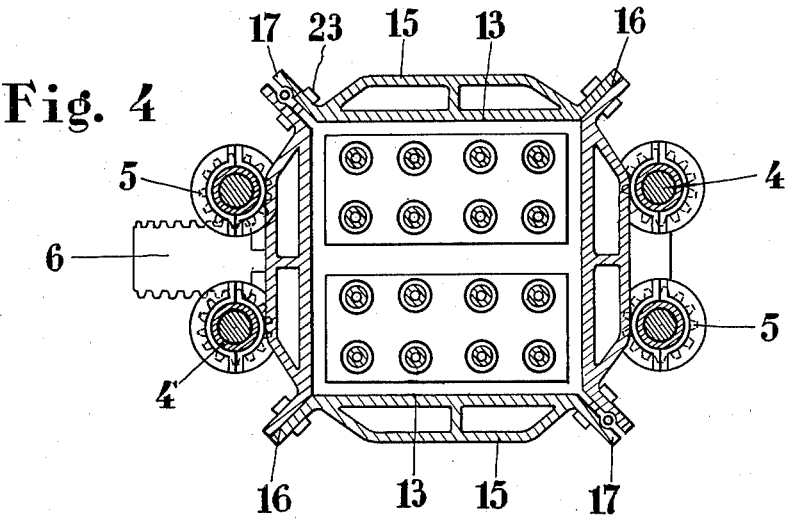
Figs. 4 and 5 are sectional views taken substantially along the lines A—B and C—D respectively of Fig. 1.

As shown in the drawing the flask 1 serving for forming the blocks, consists of a box having a rectangular shape, without cover, being provided at the bottom with cavities 14′, somewhat larger than the points of the punches 14. The box is formed of four metal plates, of iron, aluminium, or other light alloy, kept together by steel strips 2, so as to tighten it more or less by means of a screw in order to confer to said box the necessary elasticity at the moment of the final pressure. Each flask has two lateral movable handles H which are maintained lowered against the plates when the press compresses the material, and which by the action of springs provided on them are returned to the horizontal position, when the flask is withdrawn from the press. These flasks, are placed two by two between the supporting arms 3 of the press; which is provided with two of them at each side, two at the right and two at its left side. Each arm extends as a bracket from a tube 4′ which is rotatable on an upright or column 4 forming part of the frame 22 of the press. Keyed on each tube is a toothed wheel 5. The two toothed wheels 5 of two tubes 4′ are situated on the same side of the press, mesh with a rack 6, constituting extensions on opposite sides of a piston rod 7 of a piston 8, sliding in a cylinder 9 carried by the base of the frame of the press. The diameters of the toothed wheels 5 and the length of the rack 6, are calculated so that the stroke of the piston 8, corresponds to a rotation of the upright or column 4, such as for example, in the stroke of the cylinder towards the right, the two flasks 1, which were originally in the outer position shown in Fig. 5, on rotating in opposite directions, will dispose themselves one near the other on the movable platform 10 of the press while the flasks, which were originally on said platform, and which have already been submitted to the process of compression, are revolved outwards and carried to the other side of the press.

The platform 10 of the press is carried by a solid piston 11 sliding in a vertical cylinder 12, in which water under pressure is introduced.

In the frame of the press is also mounted, in the upper portion thereof, the box 13 with the punches 14. Inside said box the flasks 1 are inserted which are to be submitted to pressure.

The box 13 is formed by four sides 15, connected rigidly at two opposite corners, and connected at the two other corners 17 by means of horizontal steady pins 23 which allow the displacement through one or two centimeters of the respective edges. Between the lugs connected by said steady pins, passes, guided by two channels forming a vertical boring, a long vertical rod 18 fastened to the upper cover 19. Said rod has two collars 30 and 31, one high and the other low. When the box 13 is pushed upwards against the cover 19, which has a conical seat, the two pairs of sides 15 come in contact with each other, and mesh perfectly along the corners 17, and are thus maintained in contact during the stage of the compression, viz: when water under pressure is introduced into the punches 14.

These punches are covered in their central portion by rubber tubes, and communicate at their upper end with steel tubes 23, leading to the pressure pump. The lower portion of the rubber tubes is protected by an enlarged head and a leather disc 24. Water under pressure passes into the channels 25 provided inside the cores of the punches and enters in the space between these cores and the rubber shelves 26 covering the central portion thereof. To attain a greater safety, these rubber sleeves instead of being formed by a single tube, constitute two superposed tubes, as shown in Fig. 3. Their upper and lower edges are folded inwardly and are secured by a tight fit to the threaded ends of the central rods 27 of the punches by means of hollow nuts 28 and locknuts 29.

Pipes leading from the hollow interior of the punches 14, from the vertical cylinder 12 of the press, and from the horizontal cylinder 9, pass through a distribution panel 21 close at hand to the operator. Said panel is provided with three control handles 33, 35, 38 adapted to be revolved in opposite directions, the use of these handles being hereinafter described in relation to the working of the device.

Figure 5:
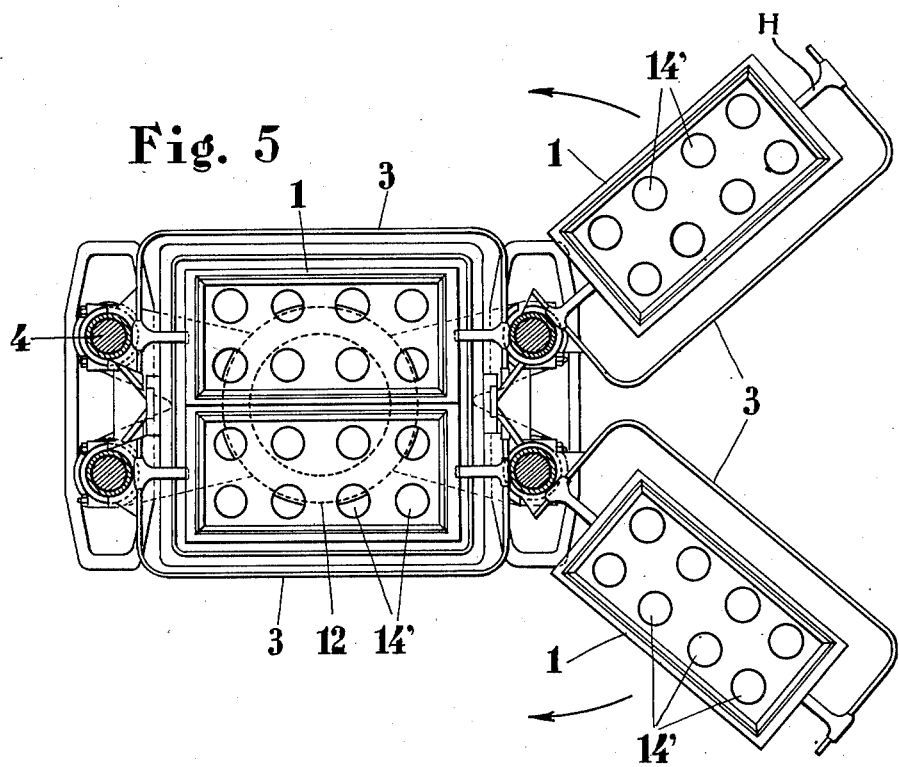

In the operation of the press, two flasks 1 full of agglomeratable material are placed between the arms 3 with their handles H outstretched (see Figs. 5 and 7). Said flasks are in the outer position shown in Fig. 5. In the box of the distribution panel 21 water under pressure coming from a hydraulic pump enters a first valve body through a holding valve 32. A distributing valve operated by handle 33 leads water under pressure to the cylinder 9. Turning said handle 33 feeds water under pressure to the right hand side of said cylinder and opens the passage at the left hand side of the cylinder, thus shifting the rack 6 to the left. This causes the two outwardly disposed flasks 1 to be swung through semi-circular paths over the platform 10 of the press. At the same time the two flasks which previously have been subjected to compressive molding will be swung outwardly away from the platform 10.

Next the handle 35 is turned in the direction f. This opens the valve in the body 34 of the distribution panel and leads water under pressure through holding valve VR to the vertical cylinder of the press. The pressure raises piston 11 and lifts platform 10, causing the two flasks superimposed thereon to be lifted off the arms 3 and forced into the box 13, the handles being forced against the sides of the flasks as they are thus lifted. The punches 14 penetrate into the masses of material in the flasks as they are lifted, going through them until they enter the cavities 14'. In the case shown in the drawings, it is supposed that the punches are sixteen in all and consequently there are also sixteen cavities in the platform. Therefore eight holes are formed in the block of each flask. When the platform has reached the upper end of its stroke and the pointed ends of the punches have entered the associated cavities provided for them, the operator turns the handle 38 to the left in the direction f. This handle controls valves in the body 32 which are similar to the valves in the body 34, the control being such as to send water under pressure into the punches 14. Said water enters into the sleeves 26 forcing the same outward and thereby compressing the material into which they have been introduced, the box 13 being unable to expand because it is blocked at both its upper and lower sides. After the desired pressure in the rubber sleeve has been obtained, the handle 38 is turned in the direction f'. This shuts off water under pressure to the sleeves and connects said sleeves with an outlet valve whereby the punches are permitted to deflate and the water contained in them returns to the reservoir of the press. Next the handles 35 is moved in the direction f'. Such action shuts off the admission of water under pressure to the cylinder 12 and permits the water to come out of said cylinder thereby allowing the piston and dies to descend: As this occurs, the platform 10 lowers and comes down with the box 13 and the flasks containing the pressed blocks or articles. After but a short descent of the blocks, the corner lugs strike the upper collars 30 of the vertical rods 18 causing the box to part on the diagonal line 17. This frees the flask with the compressed blocks which descend and finally rest on the two underlying arms 3. The descent of the box 13 also is stopped by the collars 31.

Lastly by turning handle 33 in the direction opposite to that in which it was manipulated at the beginning of the cycle, water under pressure is led into the cylinder 9 on the left hand side of the piston 8. The cylinder on the right hand side of said piston is opened to the reservoir of the press. This causes the piston to move from left to right and restores the arms to their position shown in Fig. 5 wherein the two flasks which have just had molding performed therein are swung out away from the press and off the platform. At the same time, the two flasks at the left hand side are swung over the platform.

It is to be noted that if the inner surfaces of the flasks are lined with two or more metallic nets with close meshes, disposed one over the other, and covered in their turn with close knitted and strong nylon cloth, at the moment of maximum pressure, a good portion of the water contained in the blocks is expelled, thus reducing considerably the time required for the usual drying stage of said blocks.

If rough surfaces are desired, the inner surfaces of the flasks may be covered with powdered coal, which remains attached to the surfaces of the blocks and is subsequently burnt during a baking treatment, leaving its impression in the form of cavities.

It is also to be noted that by inserting in the flask a thin metal plate, in the form of a middle wall, instead of obtaining from each flask a single block, two blocks will be obtained at the same time, having a smaller thickness.

What I claim is:

1. An apparatus for molding agglomeratable materials under pressure, said apparatus comprising a press having a platform, means selectively to reciprocate said platform vertically, a stationary member above said platform, an open top flask for containing agglomeratable material, said flask being adapted to be disposed on said platform, a retainer box, means to support said box from said stationary member above said platform, said box having an open bottom to receive a filled flask, a plurality of vertically extending, hollow, expansible tubes, said tubes being disposed in said box, a rigid member in each tube extending beyond the top and bottom thereof, means to secure the top of each rigid member to the stationary member, the bottom of each rigid member being enlarged whereby when the platform is raised with a filled flask thereon, the tubes will be protected as they are pushed in the material in the flask, means providing a passageway through each rigid member from the top thereof to the interior of its associated tube, and means selectively to supply a fluid under pressure to each passageway.

2. An apparatus as set forth in claim 1 wherein the bottom of the flask is provided with cavities to receive the enlarged bottoms of the rigid members.

3. An apparatus for molding agglomeratable materials under pressure, said apparatus comprising a press having a platform, means selectively to reciprocate said platform vertically, a stationary member above said platform, an open top flask for containing agglomeratable material, said flask being adapted to be disposed on said platform, a retainer box, means to support said box from said stationary member above said platform, said box having an open bottom to receive a filled flask, a plurality of vertically extending, hollow, expansible tubes, said tubes being disposed in said box, a rigid member in each tube extending beyond the top and bottom thereof, means to secure the top of each rigid member to the stationary member, means providing a passageway through each rigid member from the top thereof to the interior of its associated tube, and means selectively to supply a fluid under pressure to each passageway.

4. An apparatus as set forth in claim 3 wherein the box has an open top, and wherein there are provided a cover for said top, means to guide said box for vertical movement toward and away from said cover whereby said box is pushed against the cover when the platform is raised, and means to limit downward movement of the box.

5. An apparatus as set forth in claim 4 wherein the box is vertically split into a plurality of parts and wherein the top edges of said parts are shaped to cooperate with a seat in said cover so as to urge said parts together as the platform raises the box into engagement with the cover and whereby said parts can move away from one another to release the mold flask as the platform is lowered.

6. An apparatus as set forth in claim 5 wherein means is provided to limit to a slight amount the movement of the parts away from one another so as to retain the same in the general shape of the box ready to admit the flask without manipulation of said parts.

7. An apparatus as set forth in claim 3 wherein a control mechanism is provided having manually manipulatable means for governing the actuation of the means for reciprocating the platform and the means for supplying fluid under pressure to the passageways.

8. An apparatus for molding agglomeratable materials under pressure, said apparatus comprising a press having a platform, means selectively to reciprocate said platform vertically, a stationary member above said platform, an open top flask for containing agglomeratable material, a support for said flask, means to mount said support for vertical and horizontal movement, means selectively to move said support horizontally towards and away from a position in which said support is over said platform, a retainer box, means to support said box from said stationary member above said platform, said box having an open bottom to receive a filled flask, a plurality of vertically extending, hollow, expansible tubes, said tubes being disposed in said box, a rigid member in each tube extending beyond the top and bottom thereof, means to secure the top of each rigid member to the stationary member, means providing a passageway through each rigid member from the top thereof to the interior of its associated tube, and means selectively to supply a fluid under pressure to each passageway.

9. An apparatus as set forth in claim 8 wherein a control mechanism is provided having manually manipulatable means for governing the actuation of the means for reciprocating the platform, the means for supplying fluid under pressure to the passageways and the means for moving the support horizontally.

10. An apparatus for molding agglomeratable materials under pressure, said apparatus comprising a press having a platform, means selectively to reciprocate said platform vertically, a stationary member above said platform, an open top flask for containing agglomeratable material, a support for said flask, means to mount said support for vertical and horizontal movement, means selectively to move said support horizontally towards and away from a position in which said support is over said platform, a retainer box, means to support said box from said stationary member above said platform, said box having an open bottom to receive a filled flask, a plurality of vertically extending, hollow, expansible tubes, said tubes being disposed in said box, a rigid member in each tube extending beyond the top and bottom thereof, means to secure the top of each rigid member to the stationary member, the bottom of each rigid member being enlarged whereby when the platform is raised with a filled flask thereon, the tubes will be protected as they are pushed in the material in the flask, means providing a passageway through each rigid member from the top thereof to the interior of its associated tube, and means selectively to supply a fluid under pressure to each passageway.

11. An apparatus for molding agglomeratable materials under pressure, said apparatus comprising a press having a platform, means selectively to reciprocate said platform vertically, a stationary member above said platform, an open top flask for containing agglomeratable material, a support for said flask, means to mount said support for vertical movement, means to mount said support for rotation about a vertical axis for swinging movement of the flask horizontally toward and away from a position in which said support is over said platform, means selectively to oscillate said support about said vertical axis, a retainer box, means to support said box from said stationary member above said platform, said box having an open bottom to receive a filled flask, a plurality of vertically extending, hollow, expansible tubes, said tubes being disposed in said box, a rigid member in each tube extending beyond the top and bottom thereof, means to secure the top of each rigid member to the stationary member, means providing a passageway through each rigid member from the top thereof to the interior of its associated tube, and means selectively to supply a fluid under pressure to each passageway.

12. An apparatus as set forth in claim 11 wherein two supports are provided arranged to alternately locate flasks over the platform.

13. An apparatus for molding agglomeratable materials under pressure, said apparatus comprising a press having a platform, means selectively to reciprocate said platform vertically, a stationary member above said platform, an open top flask for containing agglomeratable material, said flask being adapted to be disposed on said platform, a retainer box, means to support said box from said stationary member above said platform, said box having an open bottom to receive a filled flask, a plurality of vertically extending, hollow, expansible pairs of nested tubes, a rigid member in each pair of tubes extending beyond the tops and bottoms thereof, the top and bottom edges of said tubes being folded inwardly, said rigid members being threaded adjacent the top and bottom edges of the tubes, shoulders on said rigid members adjacent said threaded portions, the edges of said tubes being disposed on said shoulders, nuts screwed on said threaded portions and pressing said tube edges against said shoulders, means providing a passageway through each rigid member from the top thereof to the interior of its associated tube, and means selectively to supply a fluid under pressure to each passageway.

14. An apparatus as set forth in claim 13 wherein the nuts are hollow and lock nuts screwed on the threaded portions of the rigid members are within said nuts.

A. VITTORIO LOCATELLI.

REFERENCES CITED

The following references are of record in the file of this patent:

UNITED STATES PATENTS

| Number | Name | Date |
|---|---|---|
| 1,142,341 | McNeil | June 8, 1915 |
| 1,282,161 | Zatzke | Oct. 22, 1918 |
| 1,396,779 | Post et al. | Nov. 15, 1921 |
| 1,480,010 | Roberts et al. | Jan. 8, 1924 |
| 1,552,064 | Lake | Sept. 1, 1925 |
| 1,708,421 | Henry | Apr. 9, 1929 |
| 1,968,774 | Meier | July 31, 1934 |
| 2,062,767 | Sexton | Dec. 1, 1936 |
| 2,395,216 | Fitzpatrick | Feb. 19, 1946 |